US00RE33874E

United States Patent [19]

Miller

[11] E Patent Number: Re. 33,874

[45] Reissued Date of Patent: Apr. 7, 1992

[54] ELECTRIC MOTOR LOAD SENSING SYSTEM

[75] Inventor: Thomas A. Miller, Bluffton, Ind.

[73] Assignee: Franklin Electric Co., Inc., Bluffton, Ind.

[21] Appl. No.: 419,507

[22] Filed: Oct. 10, 1989

Related U.S. Patent Documents

Reissue of:

[64] Patent No.: 4,703,387
Issued: Oct. 27, 1987
Appl. No.: 865,755
Filed: May 22, 1986

[51] Int. Cl.[5] ..... H02H 3/26

[52] U.S. Cl. ..... 361/79; 361/30; 361/85; 361/87; 361/92; 324/103 R

[58] Field of Search ..... 323/205, 217; 361/23, 361/30, 33, 79, 85, 87, 92; 307/87, 126, 127; 324/103 R

[56] References Cited

U.S. PATENT DOCUMENTS

| | | | |
|---|---|---|---|
| 2,953,722 | 9/1960 | Willis | 361/85 |
| 2,995,684 | 8/1961 | Fleming | 361/79 |
| 3,727,103 | 4/1973 | Finch et al. | 361/30 |
| 3,893,009 | 7/1975 | Watson | 361/82 |
| 4,117,408 | 9/1978 | Comstedt | 328/133 |
| 4,123,792 | 10/1978 | Gephart et al. | 361/30 |
| 4,333,119 | 6/1982 | Schoenmeyr | 361/92 |
| 4,420,787 | 12/1983 | Tibbits et al. | 361/79 |
| 4,541,058 | 9/1985 | Andow et al. | 361/79 |

FOREIGN PATENT DOCUMENTS 1273685 9/1963 Fed. Rep. of Germany .

*Primary Examiner*—A. D. Pellinen
*Assistant Examiner*—J. Gaffin
*Attorney, Agent, or Firm*—Marshall, O'Toole, Gerstein, Murray & Bricknell

[57] ABSTRACT

An underload protection system for an electric motor connected to first and second power supply lines, the lines being connectable to an AC power supply. The system comprises a line voltage sensing circuit connected to the first line and having a line voltage signal impressed therein, and an amplitude adjustment circuit connected to the voltage sensing circuit for adjusting the line voltage signal to produce an amplitude adjusted voltage signal. A line current sensing circuit is connected to the second line and has a line current signal impressed thereon, and a phase adjustment circuit is connected to the current sensing circuit for adjusting the phase of the current signal to produce a phase adjusted current signal. A phase responsive circuit is connected to the amplitude adjustment circuit and to the phase adjustment circuit for producing an adjusted power factor signal, and disconnect circuit is connected to the phase responsive circuit for disconnecting the power lines when the power factor is below a preset value.

5 Claims, 5 Drawing Sheets

ELECTRIC MOTOR LOAD SENSING SYSTEM

Matter enclosed in heavy brackets [ ] appears in the original patent but forms no part of this reissue specification; matter printed in italics indicates the additions made by reissue.

FIELD AND BACKGROUND OF THE INVENTION

This invention relates to a control circuit for an electric motor, which automatically turns off the motor during a motor underload condition.

Electric motors are frequently utilized to drive a water (or other liquid) pump. In some installations of this nature, damage to the pump may occur if the supply of water to the pump is disrupted for any reason. For example, a motor-pump for circulating water in a home spa or a jetted bathtub may have its water intake clogged, or the motor-pump may be turned on while there is no water in the tub or spa, with the result that the motor-pump runs with a serious underload. The pump frequently has a rotary seal which is lubricated by the water being pumped, but in the instance where the pump is running without water, the seals will run while dry. The result is that the seals become hot, and they may become permanently damaged.

The foregoing problem has been known in the prior art and is discussed, for example, in J. L. Tibbits et al. U.S. Pat. No. 4,420,787. This patent proposes a protector wherein the phase angle between the applied voltage and the current are sensed to provide an indication of the power factor. It is known that the power factor changes with the load on the motor, and consequently a motor underload condition may be detected from the value of the power factor.

However, it is also known, and mentioned in the above patent, that the power factor is influenced by the value of the line voltage. The patent proposes to compensate for line voltage variations by measuring the value of the line voltage times the power factor, but this solution is considered to be inadequate because it does not provide compensation over a sufficiently wide range of power factors.

The Gephart et al. U.S. Pat. No. 4,123,792 proposes to measure amperes times power factor in order to protect a motor in a heat pump. This proposal is also considered inadequate because it requires an accurate measurement of motor current, and a different protector would be required for each motor model.

It is important that such a protection system which functions by sensing the power factor be able to compensate for line voltage variations. If there were no compensation of this nature, the system would be subject to false tripping caused by line voltage fluctuations.

It is a general oject of the present invention to provide an improved protection system that senses the power factor and adequately compensates for changes in motor power factor due to line voltage variations.

SUMMARY OF THE INVENTION

This invention relates to a protection system for an electric motor connected to first and second power supply lines, the lines being connectable to an AC power supply. The system comprises a line voltage sensing means adapted to be connected to the first line and to have a line voltage signal impressed therein, and an amplitude adjustment circuit connected to the voltage sensing means for adjusting the line voltage signal to produce an amplitude adjusted voltage signal. Line current sensing means is adapted to be connected to the second line and to have a line current signal impressed thereon, and a phase adjustment circuit is connected to the current sensing means for adjusting the phase of the current signal to produce a phase adjusted current signal. A phase responsive circuit is connected to the amplitude adjustment circuit and to the phase adjustment circuit for producing an adjusted power factor signal, and disconnect means is connected to the phase responsive circuit for disconnecting the power lines when the power factor is below a preset value.

BRIEF DESCRIPTION OF THE DRAWINGS

The invention will be better understood from the following detailed description taken in conjunction with the accompanying figures of the drawings, wherein.

DETAILED DESCRIPTION OF THE DRAWINGS

Figure 1:
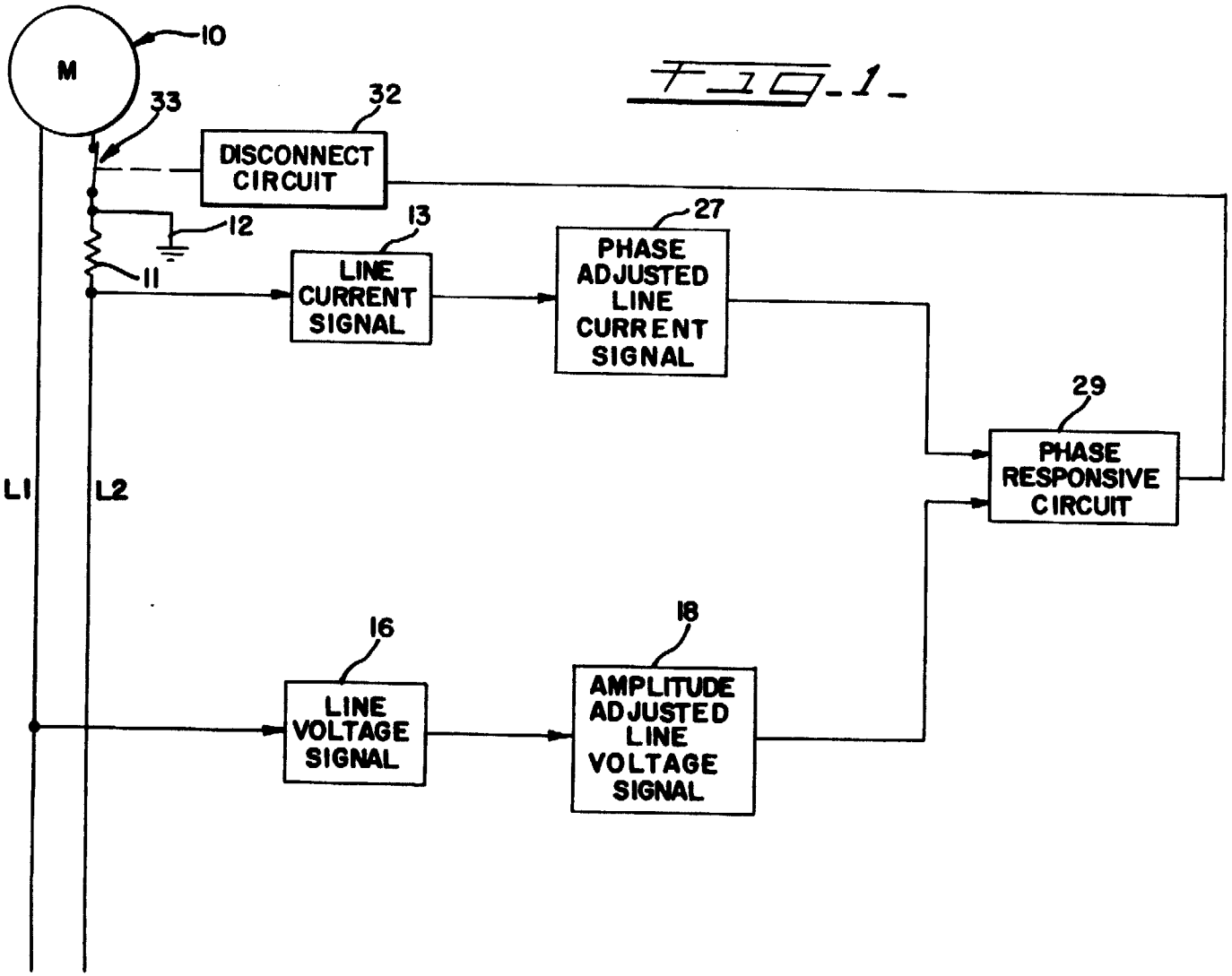
FIG. 1 is a block diagram of a system embodying the invention.
Figure 2:
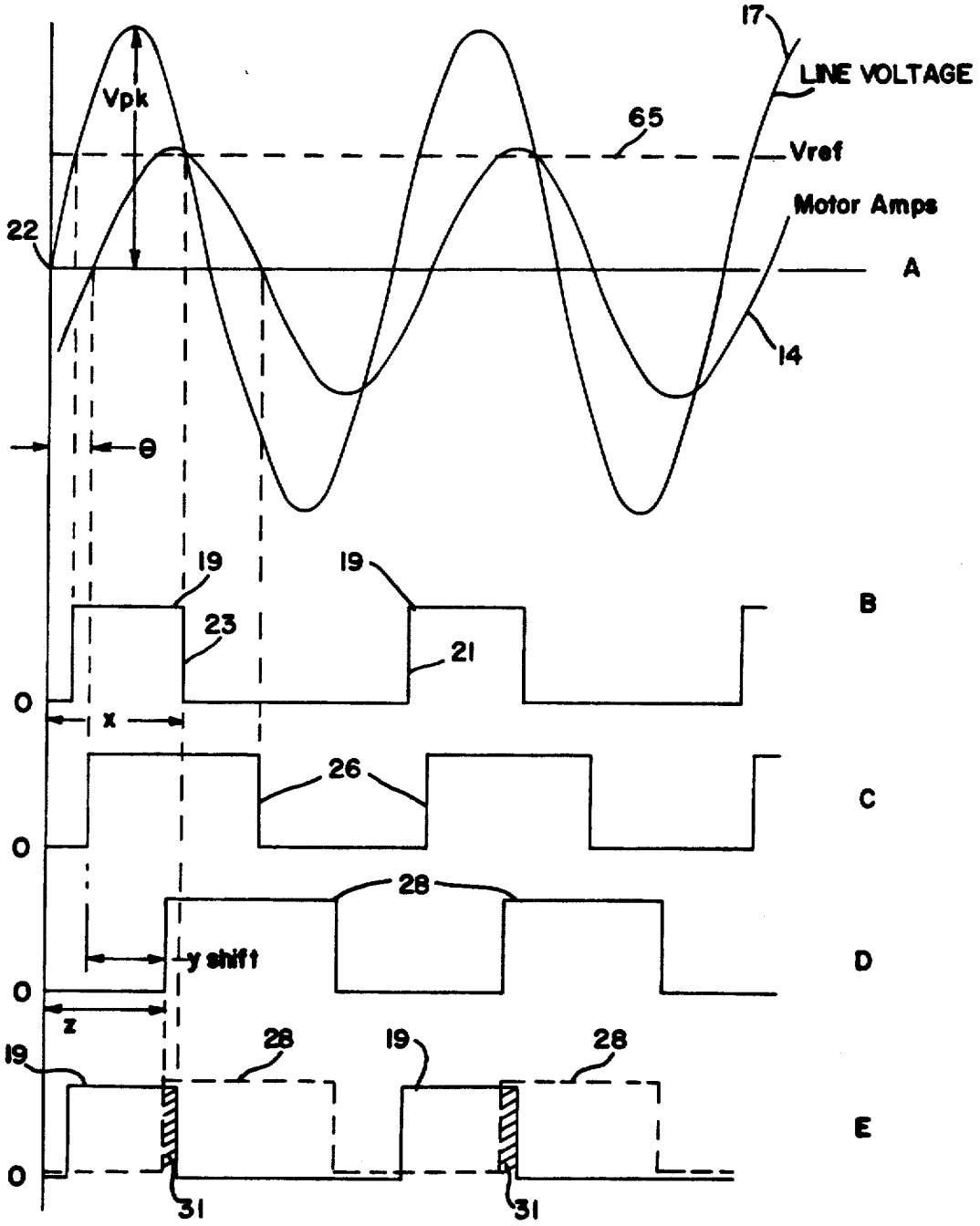
FIG. 2 is a schedule of waveforms illustrating the operation of the system.

With specific reference to FIGS. 1 and 2, an underload protection system in accordance with this invention is designed to be connected to two power lines L1 and L2 which supply single phase AC power to an electric motor 10. The motor in the present example is an induction motor. A low-value current resistor 11 is connected in the line L2, and this line is also connected to ground 12. A circuit 13 is connected to the line L2 and receives a line current representative signal 14 shown in FIG. 2. The circuit 13 forms a train of current pulses 26, each of these pulses beginning and terminating at the zero crossings of a positive half cycle of the current signal 14. It will be apparent that the phase of the pulses 26 will be the same as the current signal 14. A circuit 16 is connected to the line L1 and receives a line voltage representative signal 17 (FIG. 2). As shown in FIG. 2, the inductive motor load produces a phase displacement having a value $\theta$ between the line current and the line voltage.

Connected to the output of the circuit 16 is a circuit 18 that produces a train of square wave voltage pulses 19, each pulse 19 having a time duration 21 which is a function of the peak value of the line voltage signal 17. For example, if the voltage peak increases, the duration 21 also increases and the angle X from the previous zero crossing 22 to the end 23 of the pulse 19 also increases.

Connected to the output of the circuit 13 is a circuit 27 that produces a train of pulses 28 which are essentially the same as the pulses 26 except that the phase of the pulses 28 is shifted by an angle Y relative to the pulses 26. The pulses 28 have a phase angle Z relative to the voltage zero crossing 22.

Connected to the output of the two circuits 18 and 27 is a phase responsive circuit which receives the two trains of pulses 19 and 28. When one pulse 19 overlaps the adjacent pulse 28 of the same AC cycle, there is an overlap or power factor pulse indicated by the shaded areas 31 in FIG. 2. When an overlap and the shaded areas are present, the power factor (and therefore the load) is within the acceptable operating range. However, if an underload condition occurs, the angle Z increases while the angle X in unchanged (there is a larger phase angle and a smaller power factor), the pulses 19 and 28 fail to overlap and the shaded areas 31 disappear. This absence of the areas 31 is sensed by a disconnect circuit 32 which operates a switch 33 to disconnect the motor 10 from the power supply.

It is known that the power factor also changes with the value of the applied voltage. The following Table I shows the range of power factors for five different induction motors at three applied voltages.

TABLE I

| Power Factor Measurements of Typical Motors 50% of Rated Load | | | | | |
|---|---|---|---|---|---|
| Line Voltage | Motor #1 | Motor #2 | Motor #3 | Motor #4 | Motor #5 |
| 103 | 0.73 | 0.62 | 0.68 | 0.65 | 0.67 |
| 115 | 0.60 | 0.50 | 0.58 | 0.53 | 0.55 |
| 127 | 0.48 | 0.42 | 0.48 | 0.45 | 0.47 |

If the circuits are designed so that the circuit 32 opens the contacts 33 when an underload condition produces a power factor of 0.5 or lower, it will be apparent from the above table that, without voltage peak compensation, the motors would also be disconnected if a high voltage of 127 volts occurs with the load in the normal operating range. In addition, again without voltage peak compensation, if a low voltage condition of 103 volts occurs, a dangerously low load would have to be present before the contacts 33 would be opened.

The present voltage compensation is accomplished by adjusting the width of the pulses 19 in accordance with changes in the peak voltage. If the peak voltage increases to 127 volts, for example, the width of each pulse 19 increases causing the angle X to increase. Consequently, the two pulses 19 and 28 will overlap and the area 31 will be present down to a power factor of approximately 0.4 (depending on the values of selected circuit components). Conversely, a decrease in the peak voltage causes the width of the pulses 19 and the angle X to decrease, with the result that the area 31 will disappear at a power factor of approximately 0.6 even through the voltage peak has dropped.

Figure 3:
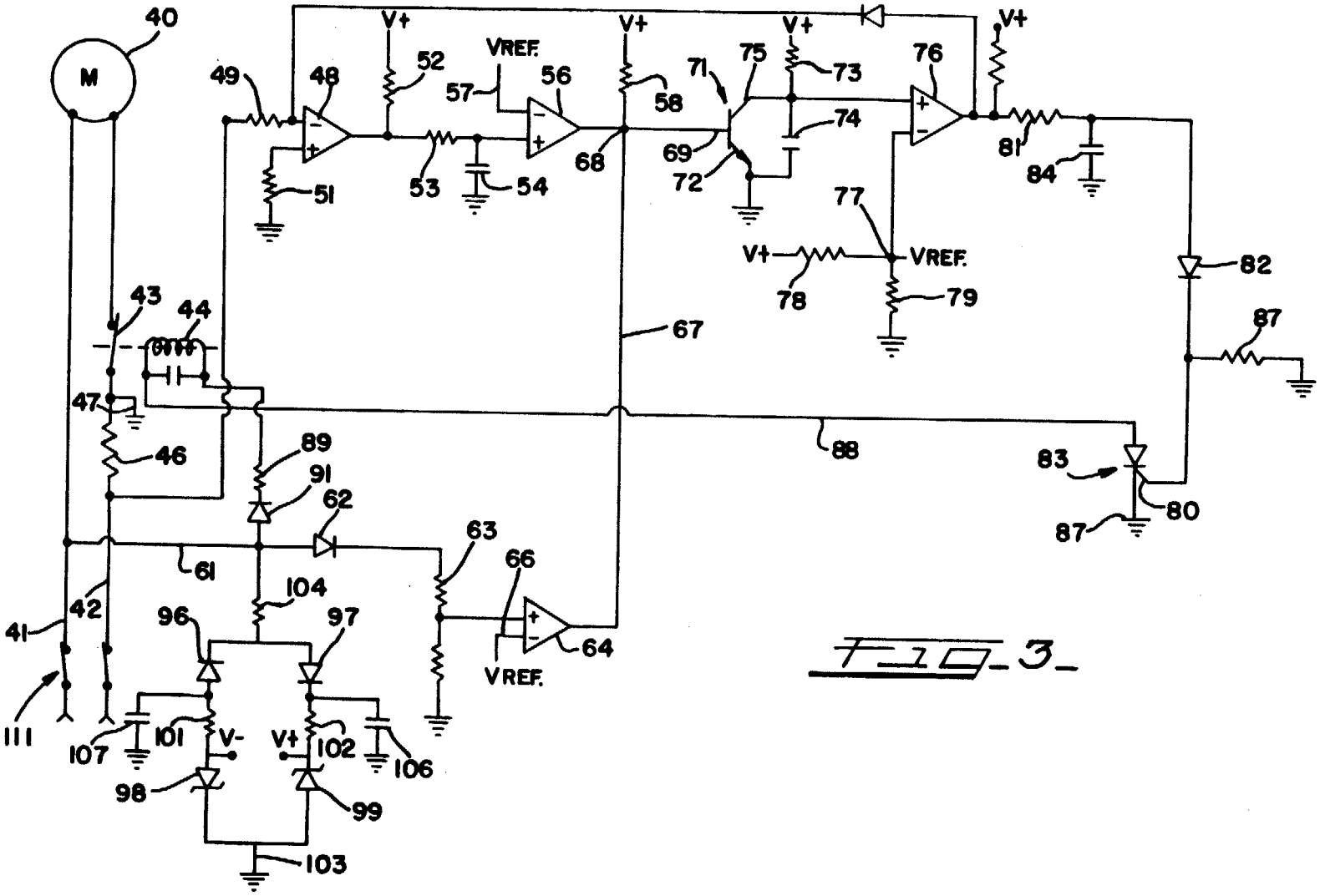
FIG. 3 is a schematic diagram of a circuit embodying the invention.

FIG. 3 shows a specific example of the invention, which functions as described above.

The system shown in FIG. 3 includes an electric motor 40 which in this specific example is an induction motor. Two power lines 41 and 42 are connected to the motor 40 in order to power it. The line 42 is connected through relay contacts 43 which are operated by a relay coil 44. The relay is arranged so that the contacts 43 are normally closed when the coil 44 is not energized. When current flows through the coil 44, it operates to open the contacts 43 and thereby disconnect the power supply on line 42 to the motor 40. Connected between the contacts 43 and power lines 41 and 42 is a current sensing resistor 46, and the line 42 is further grounded as indicated at 47. When the motor is energized (the contacts 43 are closed) the sinesoidal signal 14 appears across the resistor 46 and this signal appears on the negative input of a comparator 48, a resistor 49 being connected between the comparator 48 and the line 42. The positive input of the comparator 48 is connected through another resistor 51 to ground. The output lead of the comparator 48 is connected to a resistor 52 to V+ potential, which in this example is +5 volts. The output of the comparator 48 consists of the train of square pulses 26 shown in FIG. 2, the comparator output being positive whenever the positive half cycle of the current signal 14 appears on the line 42. This train of positive square pulses 26 is passed through a resistor 53 and a capacitor 54 which operate to shift the phase of the pulses 26, and this train is passed to the positive input of another comparator 56 which has its negative input connected by a line 57 to a reference voltage. The output of the comparator 56 comprises the pulses 28, and this output is also connected to V+ through a resistor 58.

The voltage to the motor 40 also appears on a conductor 61 connected to the line 41. The conductor 61 is connected through a diode 62 and a resistor 63 to the positive input of another comparator 64. The negative input 66 of the comparator 64 is connected to the reference voltage, and the output of the comparator 64 is connected by a conductor 67 to a summation point 68 which is connected to the output of the comparator 56. The output of the comparator 64 consists of the train of square pulses 19 shown in FIG. 1. The reference voltage on the input 66 is indicated by the dashed line 65 in FIG. 1, and when the line voltage rises above the reference voltage 65, the pulses 19 appear at the output of the comparator 64.

Thus, the summation point 68 receives both the voltage representative pulses 19 on the line 67 and the current representative pulses 28 at the output of the comparator 56. This summation point 68 is connected to the base 69 of a transistor 71. The emitter 72 of the transistor is connected to ground and the collector 75 is connected through a resistor 73 to V+, and a capacitor 74 is connected across the collector and emitter electrodes. When the transistor 71 is not conducting, the capacitor 74 is charged by current flowing from V+, through the resistor 73 and the capacitor 74 to ground. When the transistor 71 is conducting, the capacitor 74 is shorted and discharges.

As previously mentioned, the base of the transistor 71 is connected to the summation point 68. When either the output of the comparator 56 or the output of the comparator 64 is low, the base 69 will also be at a low voltage and the transistor 71 will not conduct. On the other hand, when both a current pulse 28 and a voltage pulse 19 occur simultaneously, the base of the transistor 71 is at a high voltage level and the transistor 71 is on, thereby shorting the capacitor 74.

The collector 75 of the transistor 71 is also connected to the positive input of another comparator 76. The negative input of the comparator 76 is connected to the juncture 77 of two resistors 78 and 79 which are connected between V+ and ground. The two resistors 78 and 79 thus form a voltage divider and the juncture 77 forms the previously mentioned reference voltage. This reference voltage is connected to the negative input of the comparator 76, to the negative input of the comparator 56 and to the negative input of the comparator 64. When the transistor 71 is conducting, the positive input of the comparator 76 is at essentially ground potential and it is at a lower level than the reference voltage on the point 77. On the other hand when the transistor 71 is not conducting, the capacitor 74 is charged and the voltage on the positive input of the comparator 76 is at a higher level than the reference voltage at the point 77.

The output of the comparator 76 is connected through a resistor 81 and a diode 82 to the gate electrode 80 of an SCR 83. The output of the comparator 76 is also connected through diode 80 to the negative input of comparator 48. The juncture between the resistor 81 and the diode 82 is connected by a capacitor 84 to ground, and the gate 80 is also connected through a resistor 87 to ground. The power terminals of the SCR 83 are connected between ground 87 and a line 88 which leads to one side of the coil 44 of the previously mentioned relay. The other side of the coil 44 is connected through a resistor 89 and a diode 91 to the conductor 61 that leads to the power line 41. Consequently when a positive voltage appears on the gate 80 of the SCR 83, it is triggered on and current flows from the line 41, through the conductor 61, the diode 91, the resistor 89, the coil 44, the conductor 88, the SCR 83 to ground 87. As previously mentioned, when the coil 44 is energized by current flow through it, the contacts 43 are opened and the power to the motor 10 is disrupted.

The system shown in FIG. 1 also includes a power supply for the V+ potential. This supply includes a bridge arrangement of two diodes 96 and 97, two zener diodes 98 and 99 and two resistors 101 and 102. One side of the bridge is connected to ground by a lead 103 and the other side of the bridge is connected to the conductor 61 and the power line 41 by a resistor 104. The juncture of the diode 97 and the resistor 102 is connected by a capacitor 106 to ground, and similarly the juncture of the diode 96 and the resistor 101 is connected by a capacitor 107 to ground. The voltage V+ appears at the juncture of the zener diode 99 and the resistor 102. If a V− voltage is also needed, it may be taken from the juncture of the resistor 101 and the diode 98.

In the present example wherein the motor 40 is an induction motor, the system opens the contacts 43 when an underload producing a power factor of approximately 0.5 or lower occurs. This occurs when the phase shift of the current signal (the angle Y) is approximately 70°, as shown in FIG. 2. The reference voltage 65 is approximately 0.766 of the peak of the line voltage. These values result in the shaded areas 31 being present when the motor is operating in the normal load range, but the angle Z equals the angle X when an underload occurs and the power factor falls to approximately 0.5 at rated voltage. At this trip point the shaded area 31 disappears and the contacts 43 open.

When the contacts 43 open, the current signal 14 disappears, of course, but the voltage signal on the line 61 is still present. Current continues to flow from the line 61, through the diode 91, the coil 44 and the SCR 83 to ground because the SCR remains on after it has been triggered. The bridge power supply also operates because it is connected between the line 61 and ground, and consequently V+ is still generated. The positive voltage on the output of comparator 76 will apply a positive voltage through diode 80 to the negative input of comparator 48. This will cause the output of comparator 48 to go low, which causes the output of comparator 56 to also go low. Thus the voltage at the summing point 68 will be held low so that transistor 71 will not be triggered on. Therefore the coil 44 will continue to be energized and the contacts 43 will remain open.

To reset the system, it is necessary for a person to open the main switch 111 connected in the lines 41 and 42 ahead of the system, so that power to the relay will be discontinued and the contacts 43 will close. The person can then start the motor 40 again by closing the contacts 111, but the person will be alerted to the underload condition by the fact that the motor was off while the switch 111 was closed.

Figure 4:
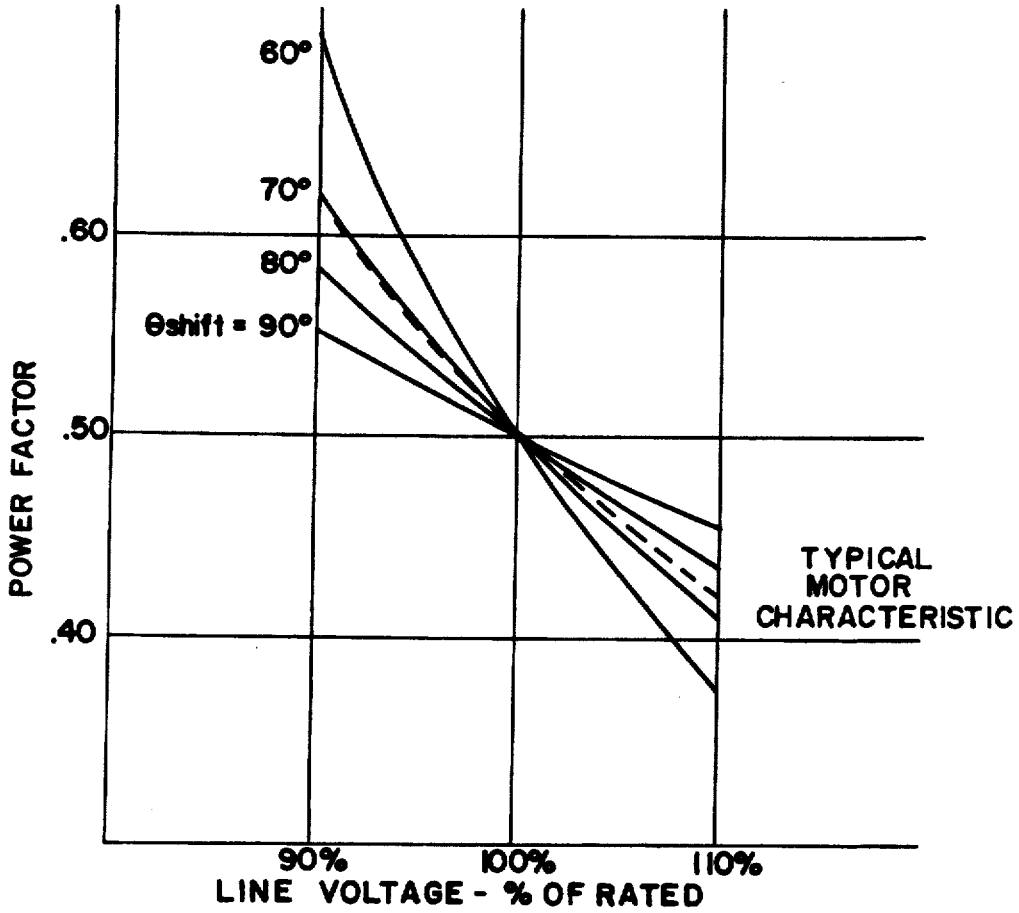
FIG. 4 is a graph that further illustrates the invention.

The system also compensates for line voltage variations as previously described in order to prevent false tripping. FIG. 4 demonstrates the range of compensation possible with the present system.

The system can accurately compensate for variations in line voltage. Referring to FIG. 2, the trip point occurs when angle $X_{volt}$ = angle $Z_{amp}$ $$X_{volt} = 90° + \text{Arcos}(V_{ref}/V_{pk})$$

$$Z_{amp} = \text{Arcos}(\text{pf}) + Y_{shift}$$

At the trip point:

$$\text{Arcos}(V_{ref}/V_{pk}) + 90° = \text{Arcos}(\text{pf}) + Y_{shift}$$

$$\text{pf} = \cos\}\text{Arcos}(V_{ref}/V_{pk}) + (90° - Y_{shift})\}$$

By selecting $V_{ref}$ and $Y_{shift}$, it is possible to closely match typical power factor variations versus line voltage.

Figure 5:
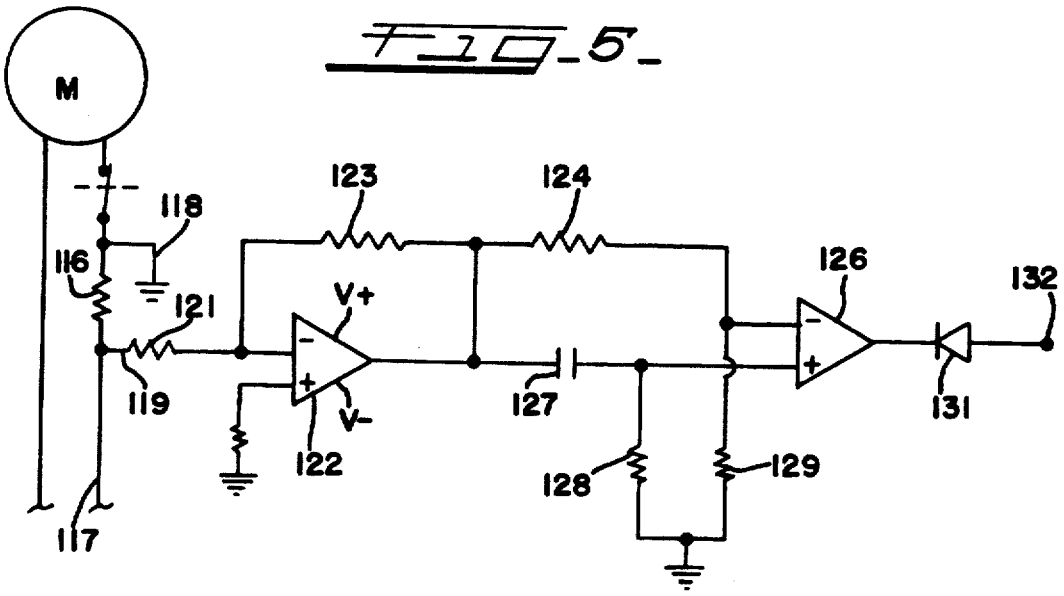
FIG. 5 is a schematic diagram showing an alternative form of the invention.

FIG. 5 illustrates an alternative circuit for shifting the phase of the current signal by the angle Z. A current resistor 116 is connected in a power line 117 between ground 118 and a conductor 119, and a line current representative voltage appears on the conductor 119. This voltage is connected through a resistor 121 to the negative input of an Op Amp 122 which functions as an amplifier, the gain of which is determined by resistors 121 and 123. The positive input is connected to ground. The output of the Op Amp 122 is connected through a capacitor 127 to the positive input of a comparator 126 and through a resistor 124 to the negative input of the comparator 126. Both inputs of the comparator 126 are connected to ground through resistors 128 and 129. The output of the comparator 126 is connected through a diode 131 to a summing point 132 which corresponds to the summing point 68 of FIG. 3. The remainder of the system may be the same as that shown in FIG. 3.

The current signal on the conductor 119 is connected by the resistors 123 and 124 directly to the negative input of the comparator 126. The signal passing through the amplifier 122 and the capacitor 127 is phase shifted by the capacitor 127—resistor 128, producing the phase shifted pulses 28 shown in FIG. 2.

While the specific example described herein relates to a system for an induction motor, the system may also be used with other types of motors. For an induction motor, the angle Z is preferably approximately 70° as described, but this angle may be different for a capacitor-run motor, for example.

The foregoing circuit eliminates the previously existing problem of false triggering. Earlier circuits were prone to false triggering which occurs when the power line potential changes. The present circuit accommodates changes in the power line circuit and prevents the circuit from dropping out the motor when the power line voltage falls. The present circuit operates in response to the power factor, and it includes an automatic adjustment for variations in the line voltage.

The resistor [23] *53* and capacitor [24] *54* circuit operate to shift the phase of the current signal by approximately 70°. This has been found to provide satisfactory results, on average, for induction motors. This value of 70° may not, however, be satisfactory for a capacitor run motor which might have or require a different amount of phase shift.

As discussed above, after the circuit trips and disconnects the motor, it is necessary to manually open the main switch and close it again in order to restart the motor. In some installations, however, such as submersible pumps for water wells, it is desirable to have the motor restart automatically after is has tripped due to an underload.

Figure 6:
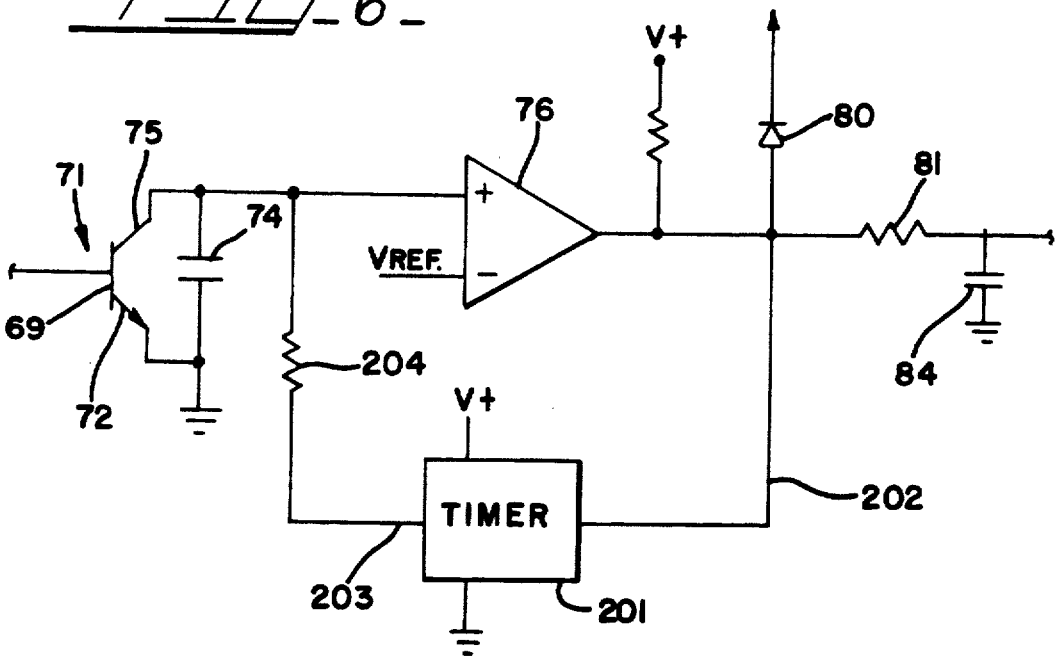
FIG. 6 is a schematic diagram showing still another form of the invention.

FIG. 6 shows a modification of FIG. 3 which includes an automatic reset feature that operates to restart the motor after a reset time interval. The circuit parts in FIG. 6 which are identical with corresponding parts shown in FIG. 3 are given the same reference numbers. The remainder of the circuit of FIG. 6 may be the same as shown in FIG. 3.

A timing circuit 201 is connected across the comparator 76, the output of the comparator 76 being connected to the timer 201 through a line 202. The output 203 of the timer 201 is connected through a resistor 204 to the positive input of comparator 76. The output 203 of the timer 201 is normally high.

As previously described, when an underload condition occurs, the output of comparator 76 goes positive and the relay contacts 43 open. This positive output of the comparator 76 also provides a signal to the timer 201, which initiates the reset time interval. At the end of the time interval, the output of the timer 201 will drop below the reference voltage 77. Thus the output of the comparator 76 will also go low, with the result that no voltage is applied to the gate 80 of the SCR 83, and current flow through the coil 44 will be interrupted, the relay contacts will reclose, and the motor will restart. The timer 201 may be a conventional circuit and have a time interval that meets the needs of specific installation.

What is claimed is:

1. [An underload] *A* protection system adapted to be connected to an electric motor and first and second power supply lines, the lines being connectable to an AC power supply supplying a line voltage and line current, said system comprising line voltage sensing means adapted to be connected to said lines and to have a line voltage signal impressed therein, an amplitude adjustment circuit connected to said voltage sensing means and adjusting the duration of the line voltage signal in proportion to the value of the line voltage to produce an amplitude adjusted voltage signal, line current sensing means adapted to be connected to the second line and to have a line current signal impressed thereon, a phase adjustment circuit connected to the current sensing means and adjusting the phase of the current signal to produce a phase adjusted current signal, phase responsive means connected to said amplitude adjustment circuit and to said phase adjustment circuit and producing [an adjusted] *a* power factor signal, and [disconnect] *circuit* means connected to said phase responsive means and [adapted to disconnect the power lines when] *responsive to* the power factor [is below a preset value] *and therefore the load on said motor.*

2. A system as set forth in claim 1, wherein said amplitude adjustment circuit comprises means forming a reference voltage which is less than the peak value of the AC line voltage, and comparator means for comparing said reference voltage with the line voltage and forming said amplitude adjusted voltage signal when the line voltage is greater than the reference voltage.

3. A system as set forth in claim 1, wherein said phase responsive means comprises a circuit connected to receive said adjusted amplitude voltage signal and said adjusted phase current signal and to produce said [adjusted] power factor signal when said adjusted voltage signal and said adjusted current signal are coincident.

4. A system as set forth in claim 3, wherein said [disconnect] *circuit* means includes normally closed switch contacts adapted to be connected in the power supply lines, said contacts being normally closed, and said contacts being opened in response to said [adjusted] power factor signal.

5. A system as set forth in claim 4, and further including timer means connected to said phase responsive means for automatically closing said contacts after a preset time period.

* * * * *